(12) United States Patent
Kupczak et al.

(10) Patent No.: US 11,258,834 B2
(45) Date of Patent: Feb. 22, 2022

(54) SYSTEM AND METHOD FOR RECORDING ONLINE COLLABORATION

(71) Applicant: Explain Everything, Inc., New York, NY (US)

(72) Inventors: Maciej Kupczak, Wroclaw (PL); Lukasz Krystek, Sieradz (PL); Piotr Śliwiński, Wroclaw (PL); Reshan Richards, Ridgefield, CT (US); Bartosz Gonczarek, Kamieniec Wroclawski (PL)

(73) Assignee: Explain Everything, Inc., New York, NY (US)

( * ) Notice: Subject to any disclaimer, the term of this patent is extended or adjusted under 35 U.S.C. 154(b) by 0 days.

(21) Appl. No.: 16/593,172

(22) Filed: Oct. 4, 2019

(65) Prior Publication Data
US 2020/0112594 A1 Apr. 9, 2020

Related U.S. Application Data

(60) Provisional application No. 62/741,735, filed on Oct. 5, 2018.

(51) Int. Cl.
*H04L 29/06* (2006.01)
*H04L 29/08* (2006.01)

(52) U.S. Cl.
CPC ...... *H04L 65/1096* (2013.01); *H04L 65/1069* (2013.01); *H04L 65/403* (2013.01); *H04L 67/1095* (2013.01)

(58) Field of Classification Search
CPC ............. H04L 12/1813; H04L 12/1818; H04L 12/1827; H04L 47/70; H04L 47/74;
(Continued)

(56) References Cited

U.S. PATENT DOCUMENTS 7,714,222 B2 * 5/2010 Taub .................... G10H 1/0058
84/600
8,233,597 B2 * 7/2012 Kerr .................. H04M 3/53333
379/88.22
(Continued)

FOREIGN PATENT DOCUMENTS

CA 2388879 A1 * 5/2001 ............. H04L 29/06
CA 2644583 A1 * 11/2007 ............. G06Q 10/10
(Continued)

*Primary Examiner* — Kostas J Katsikis
(74) *Attorney, Agent, or Firm* — Ziegler IP Law Group, LLC

(57) ABSTRACT

Disclosed is an online collaboration recording system for recording an online collaboration session, comprising a computing arrangement in communication with a plurality of devices, wherein each device is accessible by a user during the online collaborating session, wherein in operation the computing arrangement executes instructions to synchronize a digital project in said online collaborating session amongst the plurality of devices, by: establishing, via communication module, said online collaboration session for performing collaborative work on the digital project, the digital project comprising at least one object; receiving, via the communication module or an input interface, a first user input and based thereon modifying one or more properties of the at least one object to form at least one modified object; recording temporally, via a recorder, the at least one modified object to compile a temporal record; and synchronizing, via the communication module, the temporal record amongst the plurality of devices.

17 Claims, 11 Drawing Sheets

(58) Field of Classification Search
CPC ... H04L 47/76; H04L 65/403; H04L 65/1069;
H04L 65/1083; H04L 65/1096; H04L
65/4015; H04L 67/14; H04L 67/38; H04L
67/104; H04L 67/1095; H04L 69/24;
H04M 3/42; H04M 3/56; H04N 7/15;
G06F 11/2056; G06F 16/10; G06F 16/27
See application file for complete search history.

(56) References Cited

U.S. PATENT DOCUMENTS

| | | | | |
|---|---|---|---|---|
| 8,379,821 | B1* | 2/2013 | Ramage | H04M 3/42 |
| | | | | 379/202.01 |
| 8,903,905 | B2* | 12/2014 | Cadou | H04L 65/1083 |
| | | | | 709/204 |
| 9,141,710 | B2* | 9/2015 | Amrhein | G06F 16/954 |
| 9,386,279 | B2* | 7/2016 | Sumiyoshi | H04N 7/155 |
| 9,489,659 | B1* | 11/2016 | Liu | H04L 12/1827 |
| 10,298,667 | B2* | 5/2019 | Cadou | H04L 67/02 |
| 10,431,187 | B2* | 10/2019 | Miki | G09G 5/12 |
| 10,459,985 | B2* | 10/2019 | Shepherd | G06Q 10/101 |
| 2003/0023679 | A1* | 1/2003 | Johnson | G06Q 10/10 |
| | | | | 709/204 |
| 2003/0182375 | A1* | 9/2003 | Zhu | G06F 40/169 |
| | | | | 709/205 |
| 2004/0107270 | A1* | 6/2004 | Stephens | G06F 16/40 |
| | | | | 709/219 |
| 2004/0114746 | A1* | 6/2004 | Caspi | H04M 3/42221 |
| | | | | 379/202.01 |
| 2004/0143603 | A1* | 7/2004 | Kaufmann | G09B 5/08 |
| 2004/0143630 | A1* | 7/2004 | Kaufmann | G09B 7/02 |
| | | | | 709/205 |
| 2004/0153504 | A1* | 8/2004 | Hutchinson | G09B 5/08 |
| | | | | 709/204 |
| 2004/0172595 | A1* | 9/2004 | Lerner | G06F 40/171 |
| | | | | 715/201 |
| 2006/0010197 | A1* | 1/2006 | Ovenden | G06Q 10/00 |
| | | | | 709/204 |
| 2006/0010368 | A1* | 1/2006 | Kashi | G06F 40/169 |
| | | | | 715/205 |
| 2006/0031755 | A1* | 2/2006 | Kashi | G06F 40/171 |
| | | | | 715/201 |
| 2007/0005697 | A1* | 1/2007 | Yuan | G06Q 10/00 |
| | | | | 709/204 |
| 2007/0005699 | A1* | 1/2007 | Yuan | H04L 67/148 |
| | | | | 709/204 |
| 2007/0118794 | A1* | 5/2007 | Hollander | G06F 40/169 |
| | | | | 715/205 |
| 2007/0188901 | A1* | 8/2007 | Heckerman | G09B 19/00 |
| | | | | 360/23 |
| 2007/0206581 | A1* | 9/2007 | Nam | H04L 65/605 |
| | | | | 370/356 |
| 2007/0266304 | A1* | 11/2007 | Fletcher | G06F 40/169 |
| | | | | 715/230 |
| 2007/0288569 | A1* | 12/2007 | Yuan | H04L 67/148 |
| | | | | 709/204 |
| 2008/0120371 | A1* | 5/2008 | Gopal | H04M 3/564 |
| | | | | 709/204 |
| 2008/0168140 | A1* | 7/2008 | Chen | H04N 7/15 |
| | | | | 709/205 |
| 2009/0292618 | A1* | 11/2009 | Chatila | G06Q 30/0603 |
| | | | | 705/26.1 |
| 2010/0002066 | A1* | 1/2010 | Nelson | G11B 27/034 |
| | | | | 348/14.1 |
| 2010/0030578 | A1* | 2/2010 | Siddique | G06Q 40/12 |
| | | | | 705/3 |
| 2014/0033073 | A1* | 1/2014 | Pegg | H04L 65/403 |
| | | | | 715/753 |
| 2014/0280845 | A1* | 9/2014 | Owens | H04L 67/1095 |
| | | | | 709/223 |
| 2015/0019486 | A1* | 1/2015 | Gaikwad | H04L 67/42 |
| | | | | 707/625 |
| 2016/0149969 | A1* | 5/2016 | Farmer | H04L 67/10 |
| | | | | 709/204 |
| 2016/0266730 | A1* | 9/2016 | Franke | G06F 16/954 |
| 2017/0235537 | A1* | 8/2017 | Liu | H04L 67/18 |
| | | | | 715/759 |
| 2018/0293766 | A1* | 10/2018 | Carlos | G06F 3/04817 |
| 2019/0289046 | A1* | 9/2019 | Weber | H04L 65/605 |
| 2020/0065361 | A1* | 2/2020 | Lewbel | G06F 3/0485 |

FOREIGN PATENT DOCUMENTS

| | | | | |
|---|---|---|---|---|
| CA | 2993664 | A1 * | 2/2017 | H04L 65/403 |
| EP | 3073673 | A1 * | 9/2016 | G06F 16/252 |
| GB | 2455392 | A  * | 6/2009 | G06F 16/27 |
| JP | 2012209614 | A  * | 10/2012 | H04N 7/147 |
| WO | WO-2006128064 | A2 * | 11/2006 | H04L 29/06027 |
| WO | WO-2007066918 | A1 * | 6/2007 | G06Q 10/10 |
| WO | WO-2011095537 | A1 * | 8/2011 | H04L 67/38 |
| WO | WO-2012091723 | A1 * | 7/2012 | H04L 65/1069 |
| WO | WO-2014167967 | A1 * | 10/2014 | H04L 65/403 |
| WO | WO-2015155691 | A1 * | 10/2015 | G06Q 10/101 |
| WO | WO-2015155692 | A1 * | 10/2015 | H04L 67/1095 |
| WO | WO-2015155693 | A1 * | 10/2015 | G06F 9/52 |
| WO | WO-2016100100 | A1 * | 6/2016 | H04L 67/02 |
| WO | WO-2017187311 | A1 * | 11/2017 | G06F 16/2308 |

* cited by examiner

SYSTEM AND METHOD FOR RECORDING ONLINE COLLABORATION

TECHNICAL FIELD

The present disclosure relates generally to collaborative work; and more specifically, to online collaboration recording systems for recording online collaboration sessions. Furthermore, the present disclosure also relates to methods for recording online collaboration sessions. Moreover, the present disclosure also relates to computer program products comprising instructions to cause the aforesaid systems to carry out the aforesaid methods.

BACKGROUND

In recent years, the field of digital collaboration in a shared space has been growing exponentially. Digital collaboration refers to two or more people collaborating or meeting remotely on a digital project, over the shared space, to share documents, messages, or multimedia data. In order to collaborate digitally, each contributor needs to digitally communicate with other contributors, either directly or indirectly. Contributors may digitally connect with each other directly via peer-to-peer connection model or indirectly via client-server communication model. Each model has its own set of benefits and deficiencies associated with various systems and methods of digital collaboration.

An example of a digital collaboration in a shared space based on a synchronous system and method is most commonly used as online chat. Synchronous systems include exchange of information between participants simultaneously and in real-time. Another example includes web conferencing services where data shared in real-time is lost if not saved before the end of a session. Most common examples of asynchronous systems are forums, blogs, social medias and other such digitally shared spaces. Such systems include exchange of shared information between an uploader and subsequent visitors.

Many of the current collaboration systems are beginning to record the sessions, and to output the recorded sessions for distribution. For example, recording of a digital collaboration in a shared space is currently outputted as a video stream or as screen recordings. However, there are many shortcomings with such recordings of digital collaborations on a project. The complexity of shortcomings with such recordings increases with group projects where it is not possible to determine which individual contributes what content, neither it is possible to determine contents based on actions of such contributors or users. Complexity further increases with unlimited digital supply of content and with using these variety of contents (e.g. images, videos, pdf, gif, and other formats) in the shared space during the digital collaboration and its recording with present methods (video or screen recording).

Therefore, in light of the foregoing discussion, there is a need to resolve the complexity with recording of digital collaborations on digital projects between multiple users as contributors and to synchronise such recordings with individual user's contribution. More specifically, there is a need to loose rigidness of recording of digital collaboration on digital projects between multiple users as contributors to allow independent input and individual user's contribution along with allowing multiple viewpoints while carrying recording.

SUMMARY

The present disclosure seeks to provide an online collaboration recording system for recording an online collaboration session.

The present disclosure also seeks to provide a method for recording an online collaboration session.

The present disclosure also seeks to provide a computer program product comprising instructions to cause the aforesaid system to carry out the aforesaid method.

The present disclosure provides an at least partial solution to the aforementioned technical problem, or problems, associated with known art. An aim of the present disclosure is to provide a solution that at least partially overcomes the aforementioned technical problem or problems.

In one aspect, an embodiment of the present disclosure provides an online collaboration recording system for recording an online collaboration session, comprising: a computing arrangement in communication with a plurality of devices, wherein each device is accessible by a user during the online collaborating session, wherein in operation the computing arrangement executes instructions to synchronize a digital project in said online collaborating session amongst the plurality of devices, by:

i) establishing, via a communication module, said online collaboration session for performing collaborative work on the digital project, the digital project comprising at least one object;

ii) receiving, via the communication module or an input interface, a first user input and based thereon modifying one or more properties of the at least one object to form at least one modified object;

iii) recording temporally, via a recorder, the at least one modified object to compile a temporal record; and iv) synchronizing, via the communication module, the temporal record amongst the plurality of devices.

Embodiments of the present disclosure substantially eliminate, or at least partially address, the aforementioned problems in the prior art and provide an online collaboration recording system that allows for creation, execution, recording, and sharing of useful contextual information pertaining to collaborative work performed during an online collaboration session. The online collaboration recording system is easy to integrate with existing computing hardware.

For example, the present disclosure advantageously:

(a) adds collaborator's ability to provide simultaneous input as it can happen independently on various devices (with some limitations), with all manipulations being collected asynchronously and joined together to form a chain of activities.

(b) results in that the participants are unconstrained with their viewpoints. Final 'scene' can be different from the views used by the participant during the recording. It can be even applied afterward.

(c) makes recording flexible, so changes can be performed in the past sections of the recording at any given moment. State of every frame is defined by a chain of recorded changes applied to existing objects, so objects in further parts of recording reacts to changes performed earlier.

(d) makes recording multi-layered, as input can be provided not once but multiple times by re-running recording sequence and adding additional modifications to the objects. From this perspective audio/video streams of all collaborating participants are captured as additional layers added to the stack of captured states.

Optionally, in operation the computing arrangement edits the at least one modified object in the temporal record for outputting an output stream, by:
v) receiving, via the communication module or the input interface, a second user input;
vi) editing, via an editor, the temporal record based on the second user input; and
(vi) outputting, via an output interface, the output stream based on the edited temporal record.

Optionally, the computing arrangement, in operation, edits the temporal record by any one of:
adding an additional object to the temporal record,
removing the at least one modified object from the temporal record,
combining a plurality of modified objects in the temporal record, and
modifying one or more properties of the at least one modified object in the temporal record.

Optionally, the at least one object or at least one modified object comprises one or more properties, the one or more properties comprises one or more of an on-screen position, on-screen size and content of the at least one object or at least one modified object.

Optionally, the content of the at least one object or at least one modified object comprises one or more of a video file or an audio file.

Optionally, the at least one object or the at least one modified object is stored at a local data storage or a remote data storage.

Optionally, in operation the computing arrangement, via an encryption module, encrypts the temporal record prior to synchronizing the temporal record with the plurality of devices.

Optionally, in operation the computing arrangement or the plurality of devices, via a decryption module, decrypts the encrypted temporal record after synchronization.

In another aspect, an embodiment of the present disclosure provides a method for recording an online collaboration session, the method comprising:
establishing the online collaboration session to allow for performing collaborative work on a digital project, the digital project comprising at least one object, wherein the digital project is shared between a plurality of users;
receiving a first user input from one of the plurality of users and based thereon modifying the at least one object to form at least one modified object;
recording temporally the at least one modified object to compile a temporal record;
synchronizing the temporal record amongst the plurality of users.

Optionally, the method further comprises:
receiving a second user input;
editing the temporal record based on the second user input; and
outputting the output stream based on the edited temporal record.

Optionally, in the method, editing the temporal record comprises any one of:
adding an additional object to the temporal record,
removing the at least one modified object from the temporal record,
combining a plurality of modified objects in the temporal record, and
modifying one or more properties of the at least one modified object in the temporal record.

Optionally, in the method, the at least one object or at least one modified object comprises one or more properties, the one or more properties comprises one or more of an on-screen position, on screen size and content of the at least one object or at least one modified object.

Optionally, in the method, the content of the at least one object or at least one modified object comprises one or more of a video file or an audio file.

Optionally, in the method, the at least one object or the at least one modified object is stored at a local data storage or a remote data storage.

Optionally, the method further comprises encrypting the temporal record prior to synchronizing the temporal record with the plurality of devices.

Optionally, the method further comprises decrypting the temporal record after synchronizing the temporal record with the plurality of devices.

In yet another aspect, an embodiment of the present disclosure provides a computer program product comprising instructions to cause the aforesaid system to carry out the aforesaid method.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1:
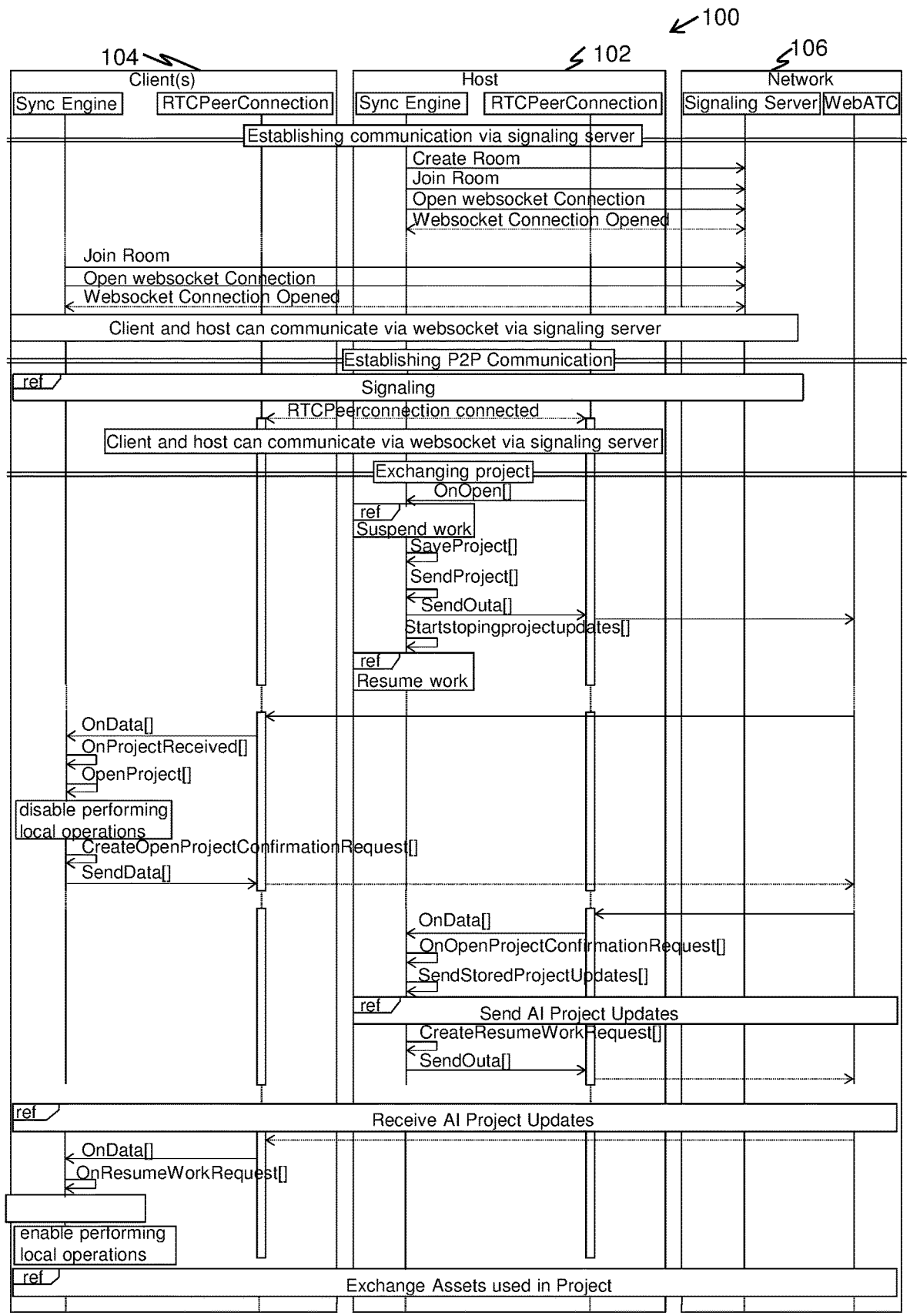
FIG. 1 illustrates an exemplary sequence diagram for implementation of an online collaboration recording system for recording an online collaboration session, in accordance with an embodiment of the present disclosure.

FIG. 1 is an exemplary sequence diagram for implementation of an online collaboration recording system 100 for recording an online collaboration session, in accordance with an embodiment of the present disclosure. The online collaboration recording system 100 comprises a computing arrangement 102 in communication with a plurality of devices 104. Notably, the computing arrangement 102 is communicably coupled to the plurality of devices 104 via a communication network 106. Each device (of the plurality of devices 104) is accessible by a user during the online collaborating session.

Throughout the present disclosure, the term "computing arrangement" refers to hardware, software, firmware and/or any combination thereof, suitable for controlling operation of the online collaboration recording system 100. Notably, the computing arrangement 102 allows for recording the online collaboration session. Optionally, the computing arrangement 102 includes an arrangement of one or more computational entities that are capable of performing various computational tasks for operation of the online collaboration recording system 100.

Throughout the present disclosure, the term "device" refers to an electronic device associated with (or used by) a user that is capable of enabling the user to perform specific tasks associated with the online collaboration session. Furthermore, the term "device" is intended to be broadly interpreted to include any electronic device that may be used for voice and/or data communication over the communication network 106. Optionally, the plurality of devices 104 enable a plurality of users associated therewith to join and participate in the online collaboration session. In such a case, the plurality of devices 104 provides the plurality of users with an interactive user interface, using which the plurality participates in the online collaboration session. Optionally, the plurality of devices 104 comprises an Input/Output module (or I/O module) to enable the users to provide inputs to and receive outputs from the online collaboration session. Example of the plurality of devices 104 include but are not limited to, cellular phones, personal digital assistants (PDAs), handheld devices, wireless modems, laptop computers, tablet computers, personal computers, etc.

The term "recording" according to the present disclosure, is a formation of a chain of changes in objects properties. In order words, the method according to the present disclosure comprises capturing states and changes within corresponding object properties instead of capturing fixed bit streams in audio/video formats. This differentiates the present invention from other prior art solutions.

The term "communication network" refers to an arrangement of interconnected programmable and/or non-programmable components that are configured to facilitate data communication between the plurality of devices 104 and the computing arrangement 102. Furthermore, the communication network 106 may include, but is not limited to, one or more peer-to-peer network, a hybrid peer-to-peer network, local area networks (LANs), radio access networks (RANs), metropolitan area networks (MANS), wide area networks (WANs), all or a portion of a public network such as the global computer network known as the Internet, a private network, a cellular network and any other communication system or systems at one or more locations. Additionally, the communication network 106 includes wired or wireless communication that can be carried out via any number of known protocols, including, but not limited to, WebRTC protocols, Internet Protocol (IP), Wireless Access Protocol (WAP), Frame Relay, or Asynchronous Transfer Mode (ATM). Moreover, any other suitable protocols using voice, video, data, or combinations thereof, can also be employed. Optionally, the communication network 106 is robust and have substantially sufficient bandwidth in order to allow the access of the online collaborating session to the users of each device.

Optionally, the communication network 106 has a star topology. In the star topology, each device (of the plurality of devices 104) is connected to the computing arrangement 102 and the computing arrangement 102 acts as a central hub or host for facilitating communication between the plurality of devices 104. Therefore, in such a case, a given device is communicably coupled to another device in an indirect manner (namely, via the computing arrangement 102).

It will be appreciated that the aforementioned star topology can be implemented in several ways. In an example, the computing arrangement 102 can be implemented by way of at least one device. In such a case, the central hub or host runs on the at least one device amongst the plurality of devices, thereby enabling the digital collaboration system 100 to work as an ad-hoc session or a meeting solution. In another example, the computing arrangement 102 is implemented by way of a server, more specifically a back-end server. In such a case, the back-end server functions as the central hub. In such a case, the online collaboration recording system 100 works as a cloud or persistent document provider solution. Furthermore, in such a case, the back-end server is coupled in communication to the plurality of devices 104, via the communication network 106.

Optionally, the communication network 106 employs WebRTC (Web Real-Time Communication) technology to facilitate communication between the computing arrangement 102 and the plurality of devices 104. Optionally, in this regard, at least one signaling server establishes communication between the computing arrangement 102 and the plurality of devices 104 by way of WebRTC signaling.

Optionally, each of the plurality of devices 104 comprise a corresponding communication module to establish the online collaboration session. It will be appreciated that the communication modules of the plurality of devices 104 are compatible with a communication module of the computing arrangement 102, for enabling proper communication within the online collaboration recording system 100. Furthermore, all communication modules (of the plurality of devices 104, as well as the computing arrangement 102) are compatible with the WebRTC technology. Such communication modules may also be referred to as "Synchronization Engine".

As an example, in the online collaboration recording system 100 at least one signaling server room (hereinafter, referred to as "virtual room") and the plurality of users are discovered, and the communication network 106 employs the WebRTC PeerConnection to facilitate real time communication transport between the computing arrangement 102 and the plurality of devices 104. In such an example, the WebRTC PeerConnection enables the online collaboration session between the central hub and the plurality of devices 104, via the at least one signaling server. Furthermore, the WebRTC PeerConnection employs Web Sockets as the at least one signaling server. Moreover, in the real-time the WebRTC DataChannels are employed for exchanging data, actions and control messages (for example, such as file-transfer) between peers. Furthermore, WebRTC Media-Tracks are employed for real-time media (for example, such as audio and/or video). As shown, the communication network 106 is responsible for mixing, forwarding and recording media from and/or to all peers. The communication network 106 establishes signaling connection between the computing arrangement 102 and the plurality of devices 104, via the at least one signaling server. As a result, the virtual room is created, wherein each virtual room has a unique identifier used by other peers to join it. Furthermore, the unique identifier related to a given virtual room can be employed by the plurality of users to join the online collaboration session.

Optionally, upon successful establishment of communication between the computing arrangement 102 and the plurality of devices 104, the computing arrangement 102 executes instructions to suspend any currently ongoing collaborative work. It will be appreciated that the currently ongoing collaborative work would be suspended before establishing said online collaboration session to allow for users of the plurality of devices 104 to complete any currently ongoing work, prior to joining the online collaborating session for collaboratively working on the digital project. More details pertaining to such suspension of the currently ongoing collaborative work have been described herein later in conjunction with FIG. 2.

In operation, the computing arrangement 102 executes instructions to synchronize a digital project in said online collaborating session amongst the plurality of devices 104, by:
(i) establishing, via a communication module, said online collaboration session to allow for performing collaborative work on the digital project, the digital project comprising at least one object;
(ii) receiving, via the communication module or an input interface, a first user input and based thereon modifying one or more properties of the at least one object to form at least one modified object;
(iii) recording temporally, via a recorder, the at least one modified object to compile a temporal record; and
(iv) synchronizing, via the communication module, the temporal record amongst the plurality of devices 104.

Throughout the present disclosure, the term "online collaboration session" refers to a communication session that is temporarily established between the computing arrangement 102 and the plurality of devices 104 for facilitating interactive exchange of information between the plurality of devices 104. Such interactive exchange of information between the plurality of devices 104 pertains to collaborative work that is to be performed on the digital project, by the plurality of users. Notably, in the online collaboration session, the plurality of devices 104 communicate with each other via messages and optionally, responses to said messages. Furthermore, in the online collaboration session, the computing arrangement 102 detects and manages conflicts between the plurality of devices 104.

Optionally, when said online collaboration session is established at (i), the plurality of users join a virtual room (or a network-based room) for performing collaborative work on the digital project. Optionally, in such a case, the plurality of users perform said collaborative work in real time or near real time.

Throughout the present disclosure, the term "collaborative work" refers to simultaneously working (for example, by way of editing content, creating content, deleting content, and the like) of the plurality of users on a given part or an entirety of the digital project. Simply put, the collaborative work relates to performing changes to the given part of the digital project over time, upon collaboration of the plurality of users. In such a case, the changes implemented on the digital project, by a given user can be recorded and are shared with the remaining users working on the same digital project, simultaneously.

Throughout the present disclosure, the term "digital project" refers to a computer-based project upon which the plurality of users collaborate to perform meaningful work. Such a digital project could pertain to a number of domains including, but not limited to, business, education, military, medical science. In an example, the digital project can be a video project related to marketing of a product or a business. In another example, the digital project can be an audio-visual project related to demonstrating a technique for research project. In yet another example, the digital project can be a digital presentation related to historical facts.

Throughout the present disclosure, the term "object" refers to a data construct of the digital project upon which collaborative work is to be performed by the plurality of users. By "at least one" it is meant that in some implementations, the digital project comprises a single object whereas in other implementations, the digital project comprises a plurality of objects. Moreover, by way of the online collaboration recording system 100, multiple users can synchronously or asynchronously collaborate for working on the given digital project.

Optionally, for synchronously collaborating on the given project, the plurality of users perform collaborative work at the same time. In such a case, any change to the digital project made by a user would be visible to all other users in real time. Optionally, for asynchronously collaborating on the given project, the plurality of users perform collaborative work at different times. In such a case, any change to the digital project made by a user would be transmitted to all other users in real time, and would be visible to such users when they choose to work on the digital project.

Optionally, said collaboration recording system is not limited to a session with objects in 2D space as the same arrangement and set or rules applies for a 3D space (as an extension of space and object properties).

Optionally, upon successful establishment of the online collaboration session, the computing arrangement 102 executes instructions to resume the collaborative work on the digital project. More details pertaining to resuming the collaborative work on the digital project have been described herein later in conjunction with FIG. 3.

At (ii), the first user input is received via the communication module or an input interface. Notably, based upon the first user input, one or more properties of the at least one object are modified to form at least one modified object. The first user input could be in form of a touch input, a voice input, a digital command, a gesture input, and the like. Upon performing such modification on the at least one object, properties of the at least one change and such object becomes the at least one modified object. Therefore, the term "modified object" refers to an object whose properties are modified according to the first user input. It will be appreciated that at a given time, the digital project may include multiple objects but only some objects among such multiple objects may be modified in the aforesaid manner. Such modification of the at least one object can be understood to be a "collaboration action" pertaining to the online collaboration session.

Optionally, at a given time, only a single collaboration action is performed within the online collaboration session. Alternatively, optionally, at a given time, a plurality of collaboration actions are performed within the online collaboration session.

Optionally, any collaboration action pertaining to the online collaboration session uses an operation object as a proxy. In this regard, the operation object is a state machine object that provides a generic mechanism for implementing at least one collaboration action in the digital project. Optionally, the operation object is created as a result of end-user input, but could also be created by automated test bot or specifically tailored bot. In such a case, the automated test bot or specifically tailored bot is also coupled in communication with the computing arrangement 102 via the communication network 106. More details of the operation object are elucidated herein later in conjunction with FIG. 4.

In an embodiment, when the computing arrangement 102 is implemented as a back-end server, the first user input is received via the communication module. In another embodiment, when at least one computing module of the computing arrangement 102 is implemented at one or more of the plurality of devices 104, the first user input is received via the input interface of said one or more of plurality of devices 104.

Optionally, the at least one object or at least one modified object comprises one or more properties, the one or more properties comprises one or more of an on-screen position, on screen size and content of the at least one object or at least one modified object. The term, "property" refers to an attribute associated with the at least one object or the at least one modified object of the digital project pertaining to which collaborative work is performed by the plurality of users during the online collaboration session. Notably, the one or more properties of the at least one object or at least one modified object are well-defined. Examples of one or more properties may include, but are not limited to on-screen position, on-screen size and content (for example, such as image, audio and the like) of the at least one object or at least one modified object.

Optionally, the at least one object or at least one modified object comprises one or more recordable properties. Optionally, the one or more recordable properties vary with respect to time. In an example, the one or more recordable properties may relate to an on-screen position of the at least one object or the at least one modified object.

Optionally, the content of the at least one object or at least one modified object comprises one or more of a video file or an audio file. In such a case, the content of the at least one object or at least one modified object refers to a given data which is a part of the collaborative work. In an example, the content of the at least one object or at least one modified object comprises one or more of the video files for example, such as a video data or the audio file for example, such as a voice data.

Alternatively, optionally, the content of the at least one object or at least one modified object comprises an image file. In such a case, the content of the at least one object or at least one modified object includes images, graphics and the like.

Yet alternatively, optionally, the content of the at least one object or at least one modified object comprises a text file. In such a case, the content of the at least one object or at least one modified object includes textual data, spreadsheet documents and the like.

Optionally, the at least one object or the at least one modified object is stored at a local data storage or a remote data storage. In an example, the local data storage can be implemented by a way of memory unit associated with operation-initiating device and/or memory unit associated with operation-receiving device. In another example, the remote data storage can be implemented by a way of memory module of the computing arrangement 102. In such a case, the memory module of computing arrangement 102 may be a memory unit of computing arrangement 102 or a database arrangement coupled in communication with computing arrangement 102. In yet another example, the remote data storage can be implemented by a way of cloud server arrangement communicably coupled to the online collaboration recording system 100.

Optionally, the digital project further comprises at least one track, wherein a given track represents how the one or more recordable properties of the at least one object or at least one modified object vary with respect to time. In other words, a given track represents changes of a given recordable property of a given object or a given modified object. Such changes are made by the plurality of users working in the digital project during the online collaboration session.

Optionally, the digital project further comprises at least one asset, wherein a given asset represents at least one file used by a given object. Examples of such files include, but are not limited to, the video file, the audio file, the image file, the text file.

Optionally, a given asset is associated with a single object. Alternatively, optionally, a given asset is associated with a plurality of objects.

Optionally, the digital project further comprises a time object, wherein the time object represents a time duration of the digital project in form of a plurality of frames. A single frame is a discrete unit of time in which a current state of the one or more recordable properties of the at least one object or the at least one modified object is recorded. Furthermore, optionally, the time object comprises a current frame index.

Optionally, a given frame type is specific to a given recordable property. Notably, for a given object or a given modified object, the current state of its one or more recordable properties can be stored in a corresponding frame. Such a frame can be referred to as a "record frame". Optionally, the current state of the one or more recordable properties of the given object or the given modified object is restored from a corresponding record from into a replay frame. It will be appreciated that by coordinating restoring of recorded state between all objects (whether modified or not) and their recordable properties, the online collaboration recording system 100 allows for restoring a state of the digital project at any given point in time. This allows to provide "replay" functionality which can be utilized by the plurality of users to view the temporal record of the collaborative work performed on the digital project instead of a final effect of said collaborative work. This provides the plurality of users with useful contextual information pertaining to the collaborative work performed during the online collaboration session.

Optionally, upon creation of a given project, at least one unique identifier is created for at least one of: the at least one object, the at least one track, the at least one asset.

In an example, a given digital project may pertain to creating a video to market a product. In such an example, the digital project may comprise the at least one object, the at least one track, the at least one asset. Moreover, each object, track, and asset has its own unique identifier that is created upon creation of said object, track, and asset. For example, the at least one object may comprise an image object having a unique identifier. In such an example, the defined sets of properties associated with the image object may include position (x,y), size (width, height) of the image object, and a corresponding image as asset. Furthermore, in such an example, the position (x,y) is identified as the at least one recordable property which changes over time and the position track is identified as the asset track for the image object.

At (iii), the at least one modified object is recorded temporally, via the recorder, to compile the temporal record. In an embodiment, the "recorder" is implemented by way of hardware, software, firmware, or a combination of these, suitable for compiling the temporal record of the online collaboration session. Moreover, the term "recording" refers to storing a state of one or more recordable properties of the at least one object or at least one modified object in the digital project, over the time duration of the digital project. This is done by utilizing a recording model that is owned by each object. Optionally, the change in the one or more recordable properties of the at least one object or at least one modified object with respect to time is recorded as the at least one tack of the digital project. Furthermore, the "temporal record" includes evidence of the collaborative work performed on the digital project, during the online collaboration session. Optionally, the temporal record is a compilation of the at least one track of the digital project. It will be appreciated that authentic moments of ideation and understanding during the online collaboration session are recorded by way of the temporal record.

Optionally, the process of temporally recording the at least one modified object is related to state transitions of the operation object. Each operation declares which recordable properties of objects it operates upon are changed due to its execution. This means that recording changes of these properties may start when operation transitions to "started" state and may finish when operation transitions to "finished" state.

Optionally, the process of temporally recording the at least one modified object is performed in a desynchronised manner. In other words, each device records a state of the digital project independently of other devices.

At (iv), the temporal record is synchronized, via the communication module, amongst the plurality of devices 104. By "synchronizing the temporal record" it is meant that the temporal record is communicated to all users performing the collaborative work on the digital project substantially simultaneously. In other words, "synchronizing the temporal record" pertains to sharing the temporal record between all users working in the online collaborating session at the same time. As a result, said users have an up-to date record of the collaborative work that is performed on the project. This helps said users to be on the same page regarding progress of work on the digital project for collaborating in a very efficient manner. It will be appreciated that the online collaboration recording system 100 serves as an up-to date whiteboard whereupon said users can collaborate efficiently for continuous development and feedback pertaining to the digital project.

Optionally, the temporal record is synchronized by way of the computing arrangement 102. In such a case, the plurality of devices 104 transmit their recorded changes to the at least one object (which are optionally recorded in form of tracks) to the computing arrangement 102 whereat such data unified to compile the temporal record. Thereafter, the temporal record is synchronously transmitted to the plurality of devices 104.

Optionally, in operation the computing arrangement 102 edits the at least one modified object in the temporal record for outputting an output stream, by:

(v) receiving, via the communication module or the input interface, a second user input;

(vi) editing, via an editor, the temporal record based on the second user input; and (vi) outputting, via an output interface, the output stream based on the edited temporal record. Therefore, the second user input pertains to editing of the temporal record. Such editing of the at least one modified object can be understood to be another "collaboration action" pertaining to the online collaboration session. The output stream comprises the edited temporal record and provides the up-to-date edited temporal record to the plurality of users.

Optionally, the editing of the temporal record is performed in a non-linear manner. Notably, the temporal record can be compiled by assembling recordings of collaborative work performed at various time instants in a flexible manner (for example, by rearranging such recordings, overriding previously saved recordings, and the like). As a result, the editing need not be done in any time-specific manner but any portion of the temporal record. Beneficially, the editing of the temporal record provides a customizable temporal record, thereby creating well-edited temporal records. Therefore, such temporal records provide most relevant information associated with the digital project to all the users who have access to the digital project.

Optionally, the computing arrangement 102, in operation, edits the temporal record by any one of:

adding an additional object to the temporal record, removing the at least one modified object from the temporal record, combining a plurality of modified objects in the temporal record, and modifying one or more properties of the at least one modified object in the temporal record. Such editing operations allow for performing object-based editing to modify content of the temporal record. Therefore, the temporal record of the collaborative work on the digital project is customizable according the users' preferences and/or requirements.

In an example, the temporal record may include three objects, wherein the content of the three objects are three video files. In such a case, one additional object comprising a video file may be added to the temporal record.

In another example, the temporal record may include five objects, wherein the content of the five objects is one audio file each. In such a case, two objects may be removed from the temporal records, thereby resulting in three objects having one audio file each.

In yet another example, the temporal record may include three objects, wherein the content of the two objects is one audio file each and the content of one object is a video file. In such a case, two objects having similar content may be combined in the temporal record.

In still another example, the temporal record may include two objects, wherein the content of the two objects is one video file each. In such a case, two objects may have different properties. Furthermore, in such a case, the properties may be modified in the temporal record for simplification.

Optionally, in operation the computing arrangement 102, via an encryption module, encrypts the temporal record prior to synchronizing the temporal record with the plurality of devices 104. The term "encryption" refers to conversion the temporal record into a specific code, thereby preventing any unauthorized access to the temporal record. Notably, the temporal record is encrypted, via an encryption module, thereby providing security to the temporal record. In such a case, only authorized users can access the temporal record via their associated devices. As a result, there is provided a solution for a safe and secure sharing of the digital project. The encryption can be implemented by various commonly known techniques. Examples of the encryption technique include, but are not limited to, hashing, public-key cryptography, private-key cryptography.

Optionally, in operation the computing arrangement 102 or the plurality of devices 104, via a decryption module, decrypts the encrypted temporal record after synchronization. When the temporal record is encrypted, via the encryption module for providing security to the temporal record, the decryption module is utilized for decrypting the encrypted temporal record after synchronization. Notably, the encrypted temporal record is in form of the specific code which cannot be understood by the user. However, to allow the encrypted temporal record to be understood and subsequently used by the user there is a need to convert such encrypted temporal record into a readable format. Therefore, the decryption module is used in order to convert the encrypted temporal record into a readable form.

Figure 2:
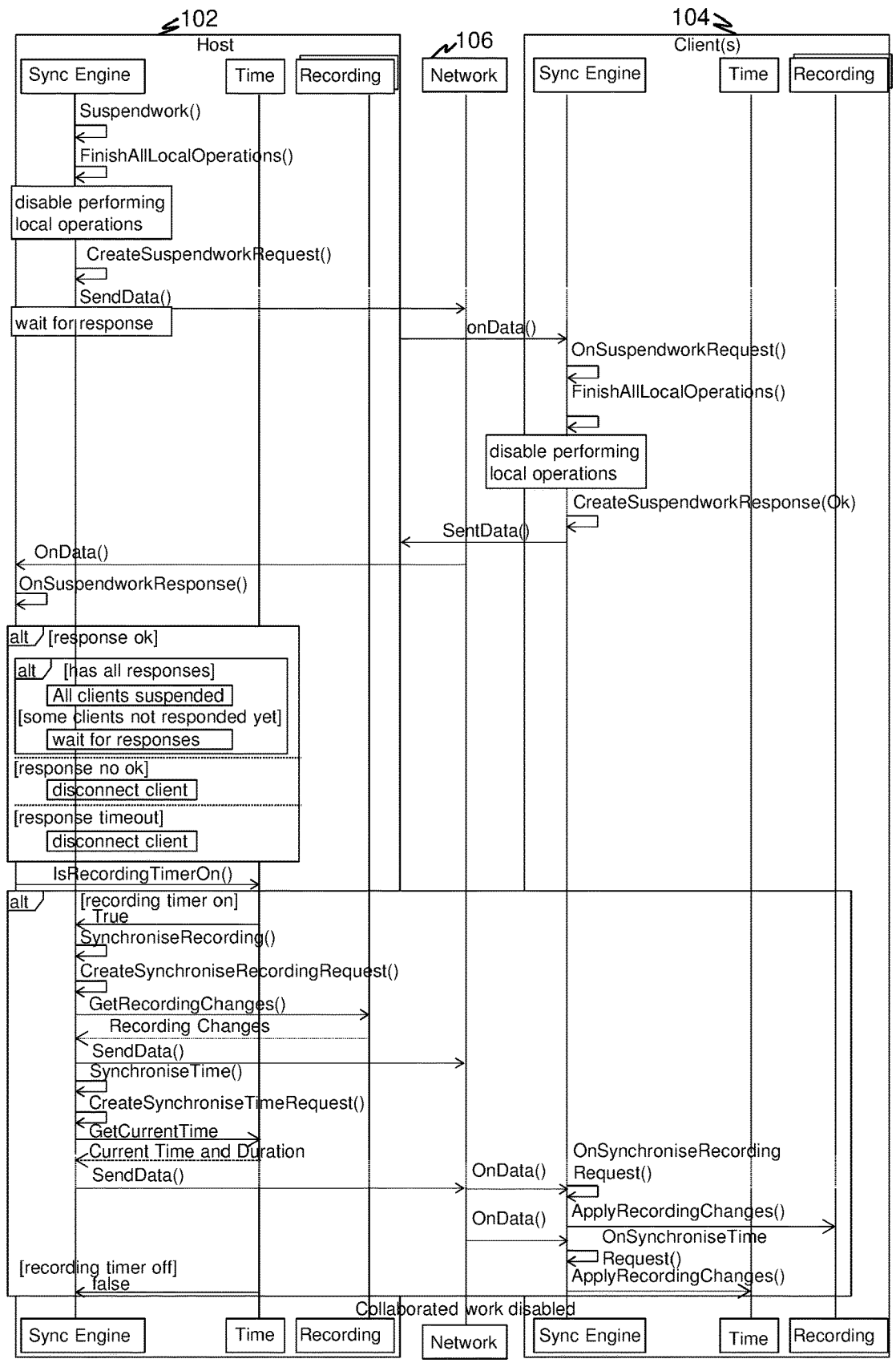
FIG. 2 illustrates an exemplary sequence diagram for suspending ongoing collaborative work using the online collaboration recording system, in accordance with an embodiment of the present disclosure.

FIG. 2 is an exemplary sequence diagram for suspending ongoing collaborative work using the online collaboration recording system 100, in accordance with an embodiment of the present disclosure. In the exemplary sequence diagram, the computing arrangement 102 disables performing local operations and thereafter, sends requests to the plurality of devices 104 to suspend collaborative work, via the communication network 106. Upon receiving the requests to suspend collaborative work, the plurality of devices 104 disable performing of local operations, and thereafter, send responses for said request to the computing arrangement 102, via the communication network 106. The computing arrangement 102 waits to establish a new collaboration session until it receives responses from each device of the plurality of devices 104. Upon receiving responses from each device of the plurality of devices 104, the computing arrangement 102 suspends all ongoing collaborative work.

Figure 3:
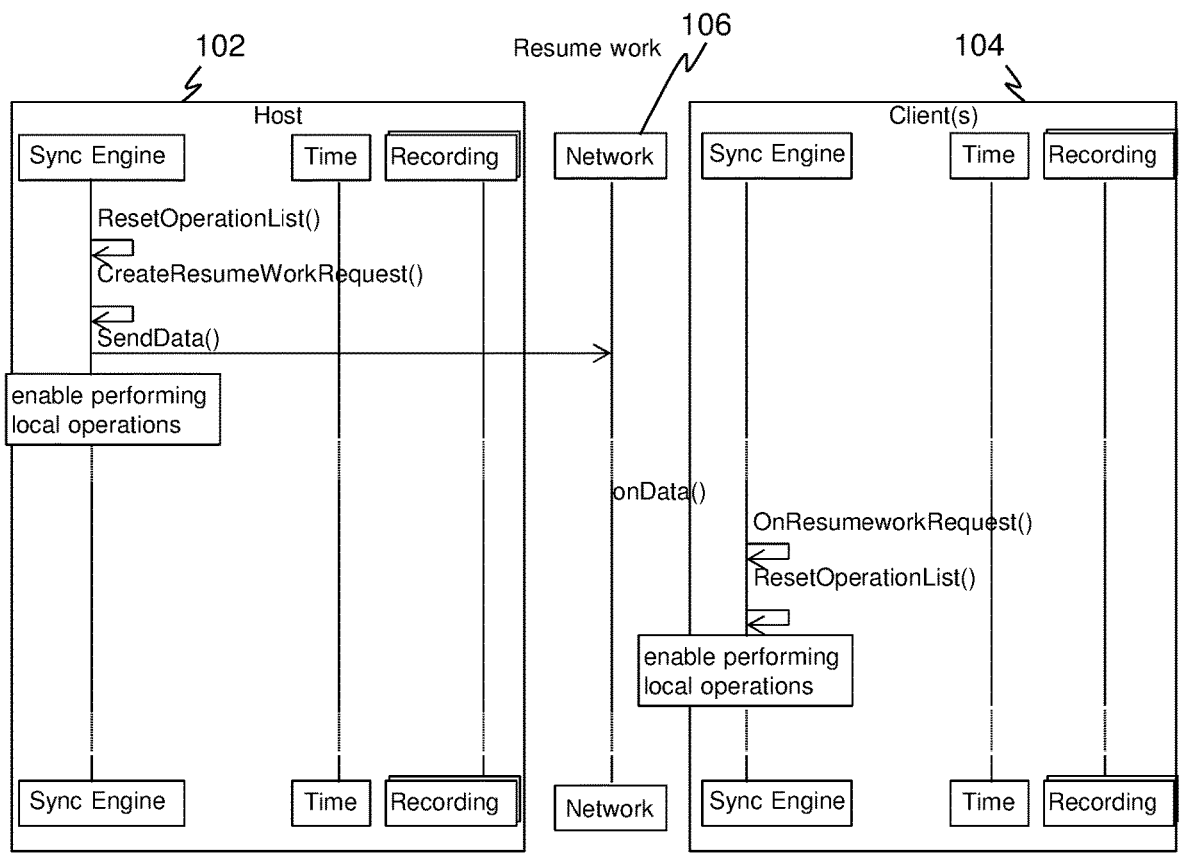
FIG. 3 illustrates an exemplary sequence diagram for resuming collaborative work using the online collaboration recording system, in accordance with an embodiment of the present disclosure.

FIG. 3 is an exemplary sequence diagram for resuming collaborative work using the online collaboration recording system 100, in accordance with an embodiment of the present disclosure. In the exemplary sequence diagram, the computing arrangement 102 resets its operation list and creates resume work requests to be sent to the plurality of devices 104, and enables performing local operations. Such resume work requests are sent from the computing arrangement 102 to the plurality of devices 104 via the communication network 106. The plurality of devices 104 execute the resume work requests and reset their operation lists. Thereafter, the plurality of devices 104 enable performing local operations. Once all devices enable performing local operations, collaborative work can be performed on the digital project.

Optionally, resuming collaborative work using the online collaboration recording system 100, the computing arrangement 102 aggregates updates to a plurality of digital projects that are sent to a first group of devices connected to the computing arrangement 102 until a new device sends an open project confirmation request to the computing arrangement 102. Such a new device from the second group sends the open project confirmation request after receiving and loading the digital project into memory. Upon receiving the open project confirmation request, the computing arrangement 102 sends all project updates to said new device followed by "resume work" request. The new device executes all project updates as received. Upon receiving "resume work" request the new device is considered as fully connected with the up-to-date digital project which gives an end-user associated with the new device the ability to perform collaborative work on the digital project.

Figure 4:
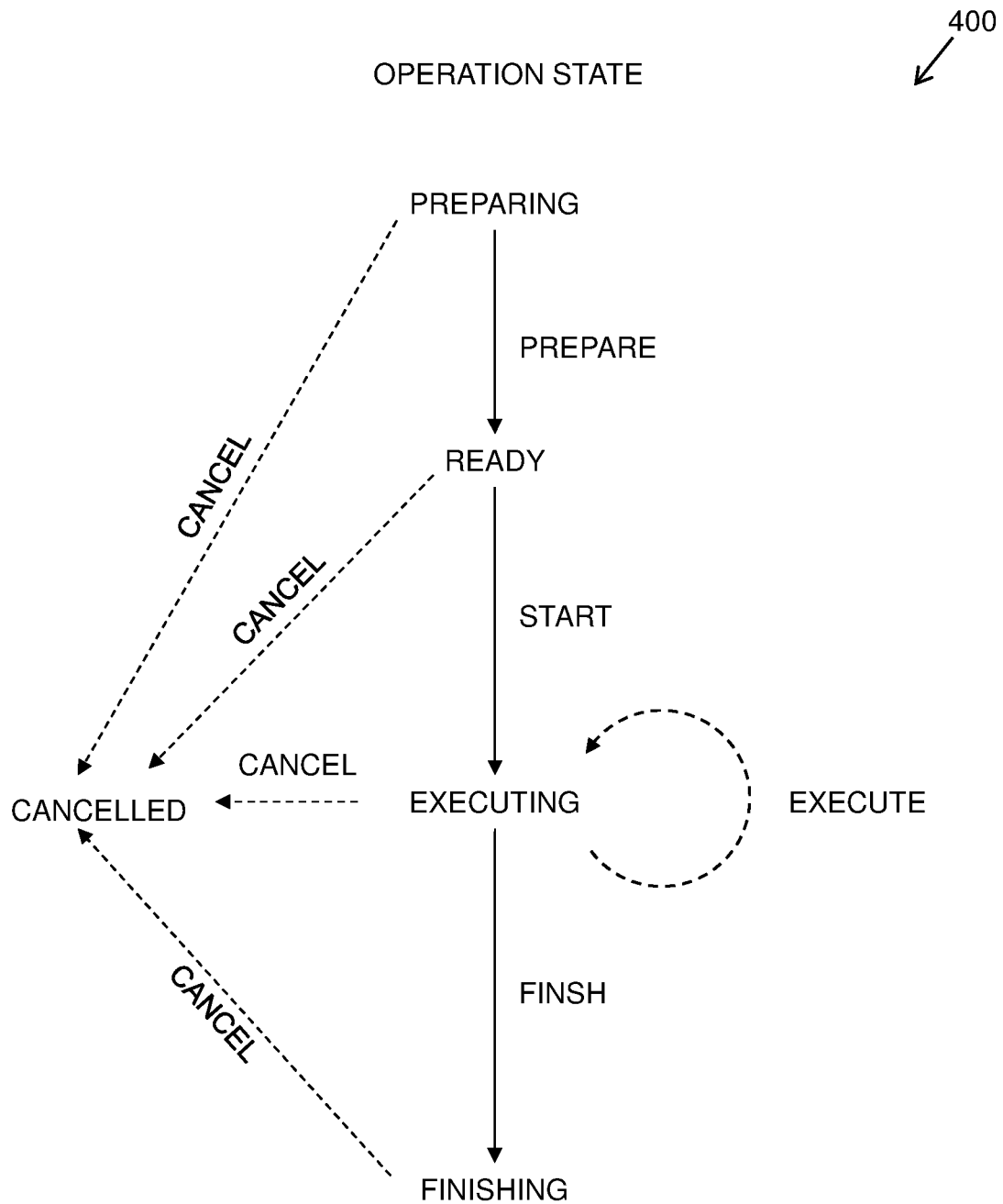
FIG. 4 illustrates an exemplary operation object, in accordance with an embodiment of the present disclosure.

FIG. 4 illustrates an exemplary operation object 400, in accordance with an embodiment of the present disclosure. As shown, the exemplary operation object 400 details various states of at least one operation that is to be performed on a given object of the digital project. Notably, the at least one operation pertains to the at least one collaboration action that is to be performed for the given object. Upon implementation of a given operation, the given object undergoes a state transition from one state to another state. Optionally, such a state transition is communicated (for example, using a WebRTC data channel) from a first device (namely, an initiating device of a user who initiates the given operation) to a second device (namely, a receiving device of a user who receives an update of the given operation) by sending an operation message with information specific to state transition and operation type pair that would allow for recreation of the given operation by the second user. It will be appreciated that since the operation object 400 is generic in nature, it allows for performing discrete operations (for example, such as changing colour of an object) as well as long, continuous operations (for example, such as moving an object by moving a finger on a screen of a device).

The exemplary operation object 400 depicts five states of an operation (such as preparing, readying, executing, cancelling and finishing) that is to be performed on the given object of the digital project.

Optionally, the receiving device is: a device among the plurality of devices 104, the computing arrangement 102.

FIG. 4 is merely an example, which should not unduly limit the scope of the claims herein. A person skilled in the art will recognize many variations, alternatives, and modifications of embodiments of the present disclosure.

Figure 5A:
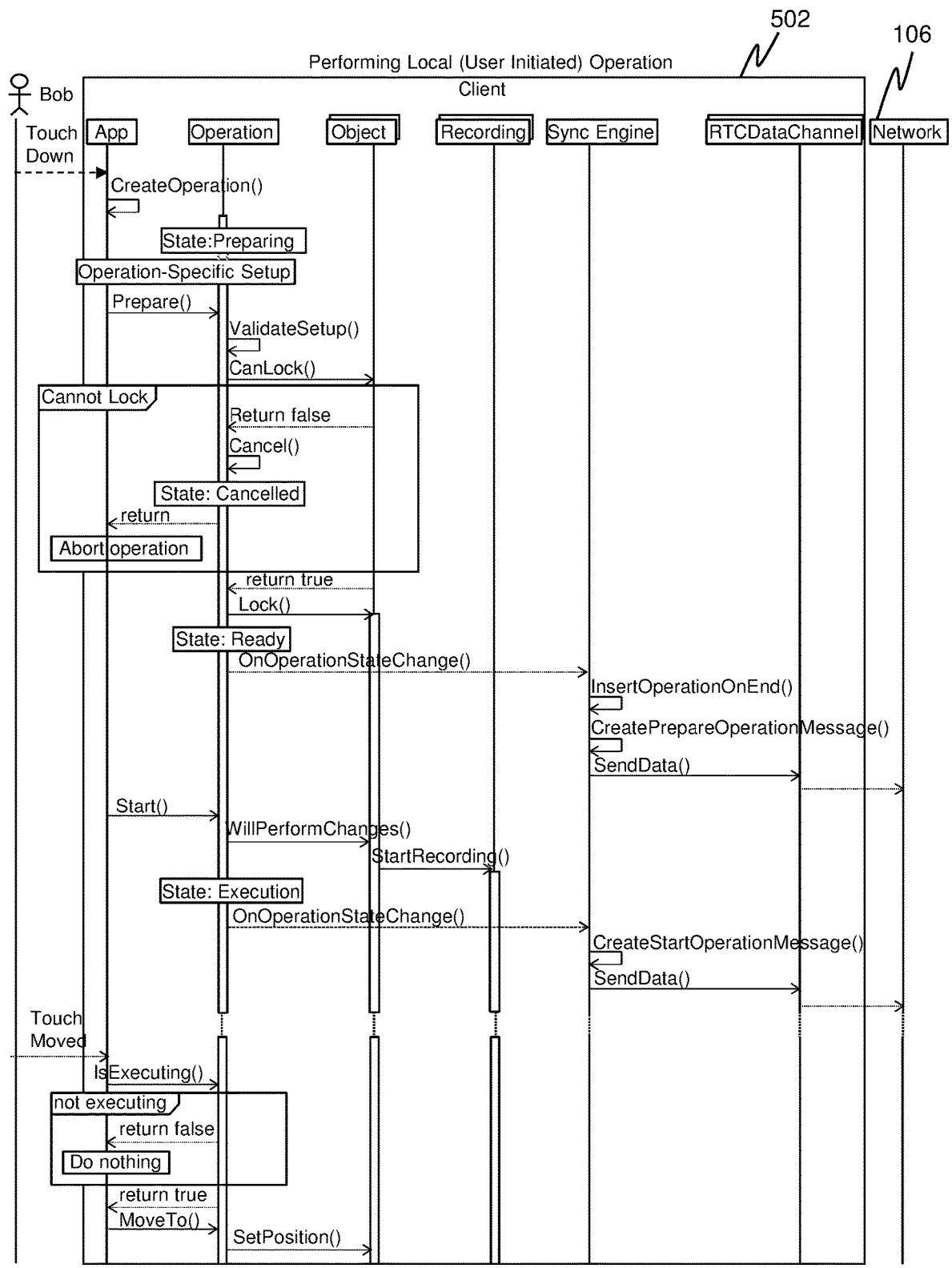
FIGS. 5A and 5B illustrate an exemplary sequence diagram for a given operation transfer between an initiating device and a receiving device whilst performing collaborative work, from a perspective of the initiating device, in accordance with an embodiment of the present disclosure.
Figure 5B:
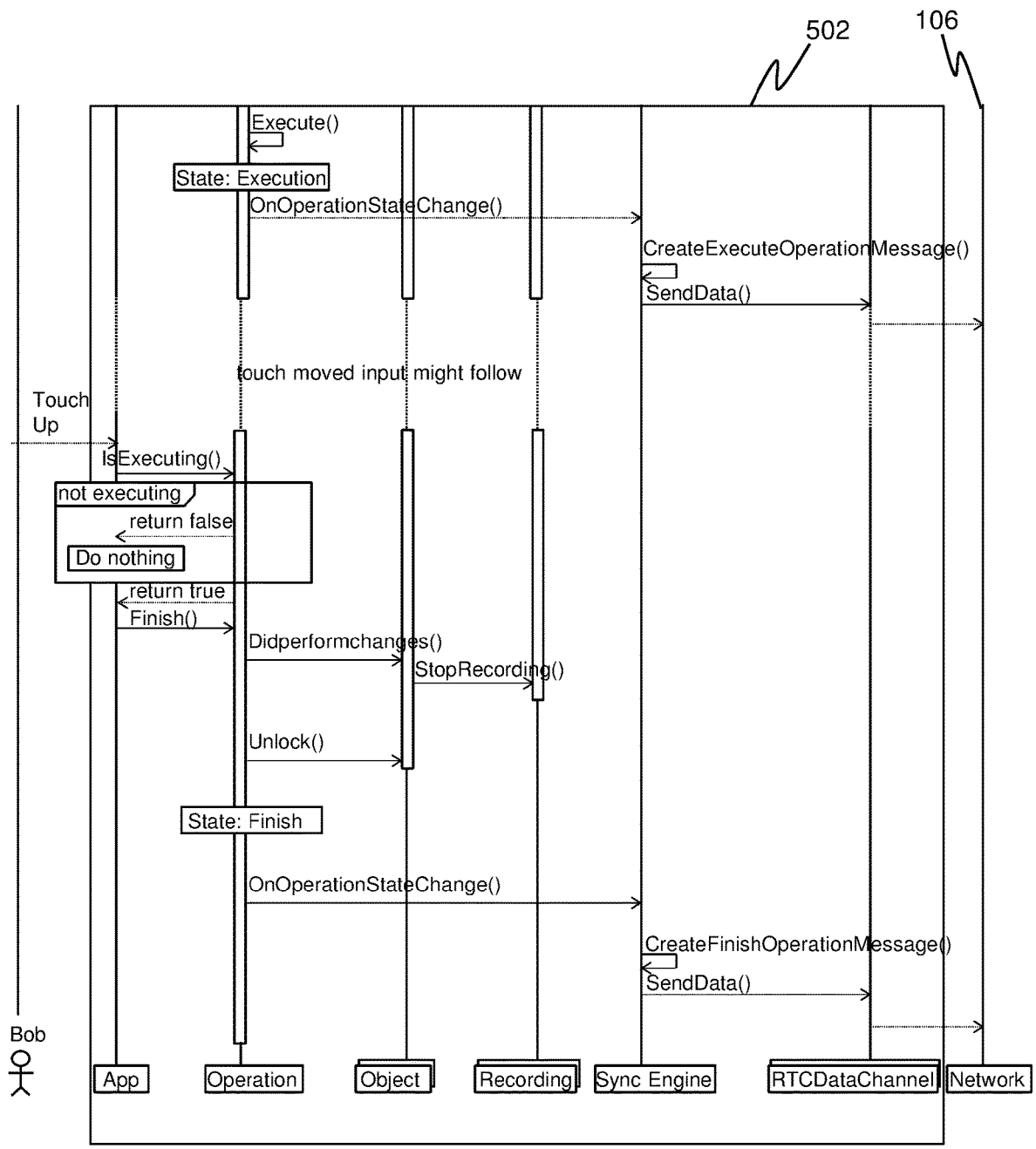

FIGS. 5A and 5B illustrate an exemplary sequence diagram for a given operation transfer between the initiating device 502 and the receiving device whilst performing collaborative work, from a perspective of the initiating device, in accordance with an embodiment of the present disclosure. In FIGS. 5A and 5B, the initiating device 502 creates an operation that is to be performed upon the given object, based upon an input from the user associated with the initiating device 502. An operation-specific setup is prepared and validated at the initiating device 502. If the operation-specific setup is unable to lock the object, the operation is aborted. If the operation-specific setup is able to lock the object, the operation is said to be in ready state. The initiating device 502 transmits the operation-specific setup to the receiving device via the communication network 106, whilst also starting execution of the operation locally. The operation stays in executing state until it attains completion (namely, finishing) or is cancelled.

FIGS. 5A and 5B are merely examples, which should not unduly limit the scope of the claims herein. A person skilled in the art will recognize many variations, alternatives, and modifications of embodiments of the present disclosure.

Figure 6A:
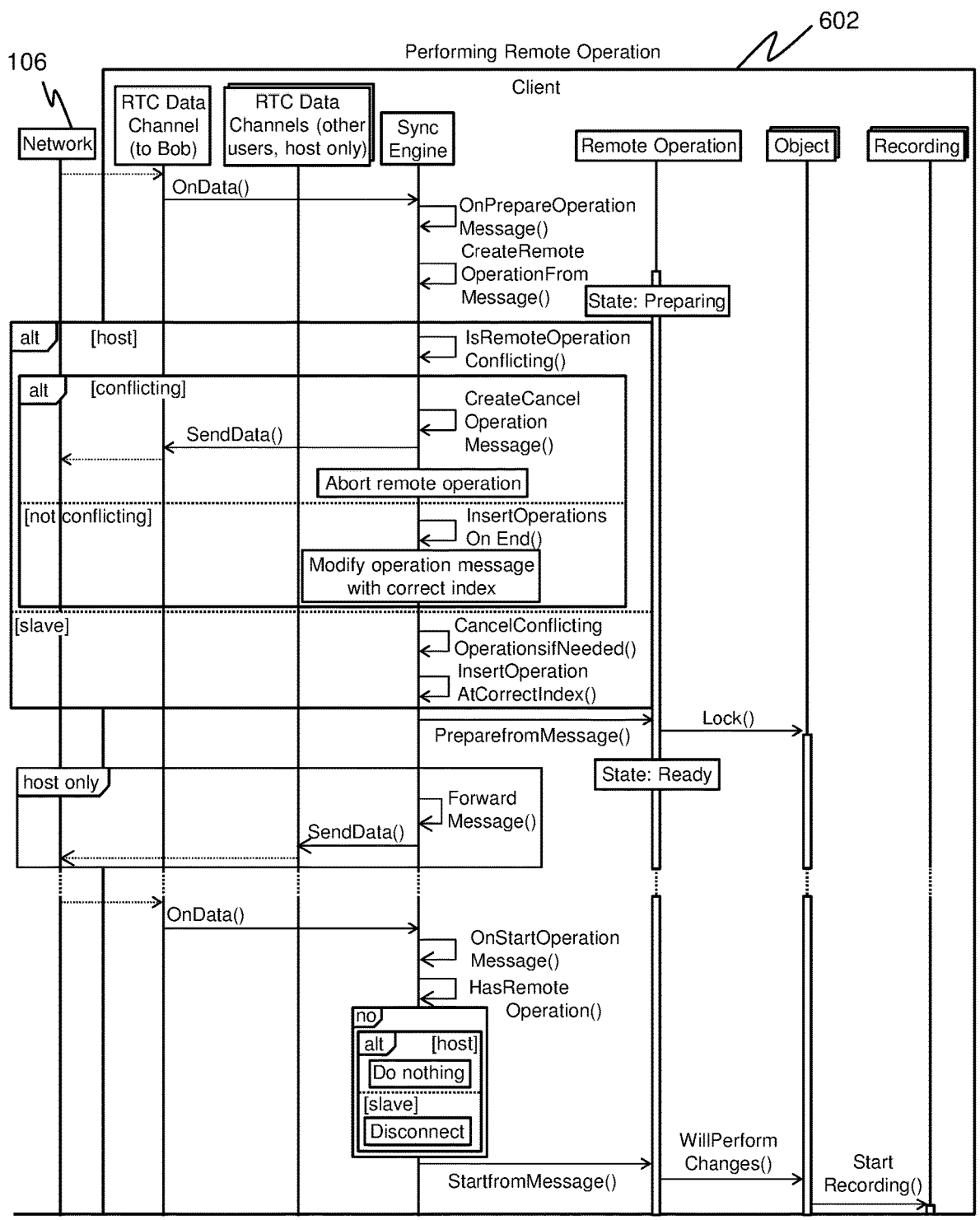
FIGS. 6A and 6B illustrate an exemplary sequence diagram for the given operation transfer of FIGS. 5A and 5B, from a perspective of the receiving device, in accordance with an embodiment of the present disclosure.
Figure 6B:
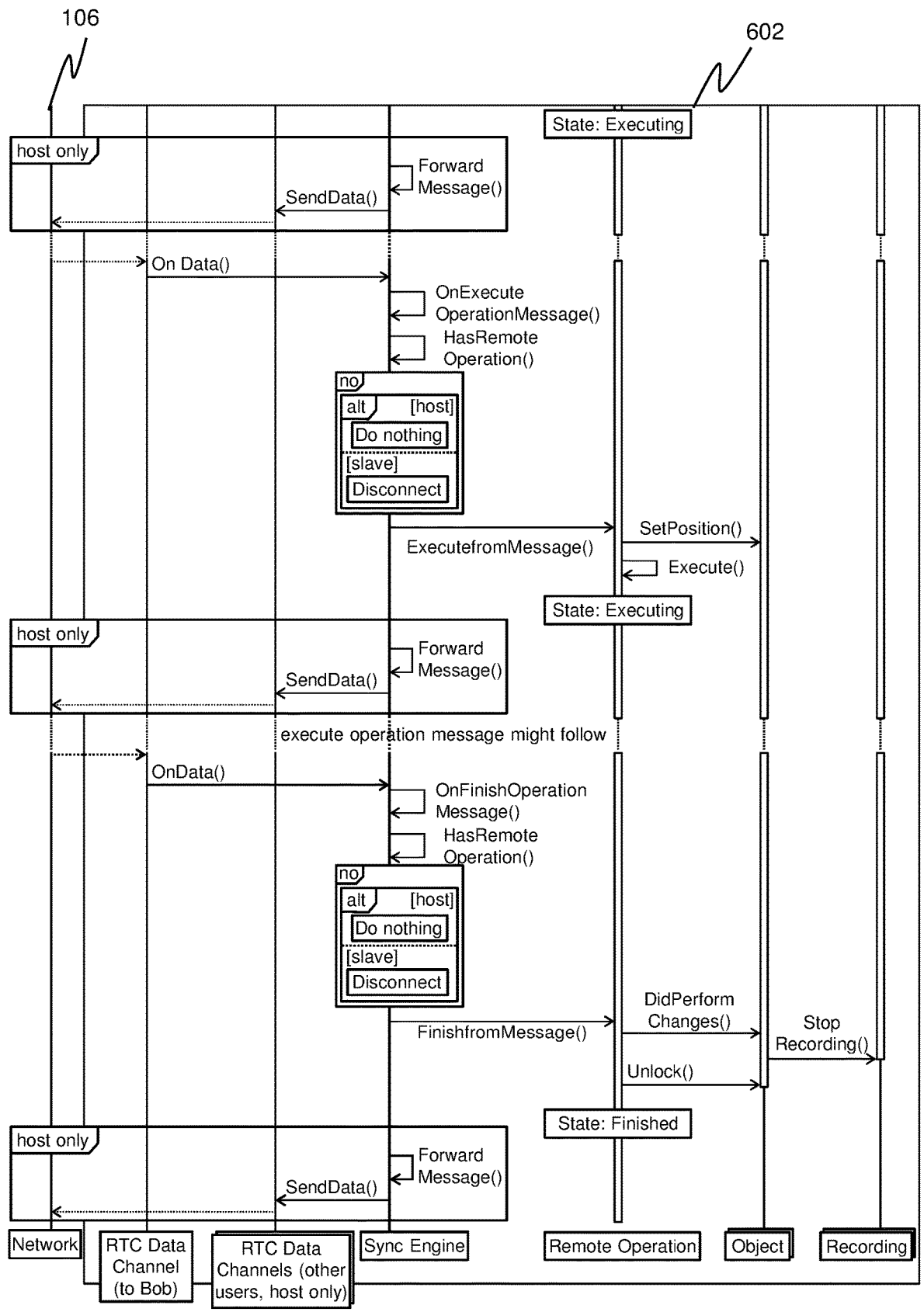

FIGS. 6A and 6B illustrate an exemplary sequence diagram for the given operation transfer of FIGS. 5A and 5B, from a perspective of the receiving device 602, in accordance with an embodiment of the present disclosure. In FIGS. 6A and 6B, the receiving device 602 receives the operation-specific setup transmitted by the initiating device 502, via the communication network 106. Subsequently, at the receiving device 602, a state of a remote operation changes to 'preparing'. Thereafter, the remote operation is checked for possible conflicts, and its status changes to 'ready' when all conflicts (if any) are resolved. The receiving device 602 begins executing the remote operation. The remote operation stays in executing state until it attains completion (namely, finishing) or is cancelled.

FIGS. 6A and 6B are merely examples, which should not unduly limit the scope of the claims herein. A person skilled in the art will recognize many variations, alternatives, and modifications of embodiments of the present disclosure.

Figure 7:
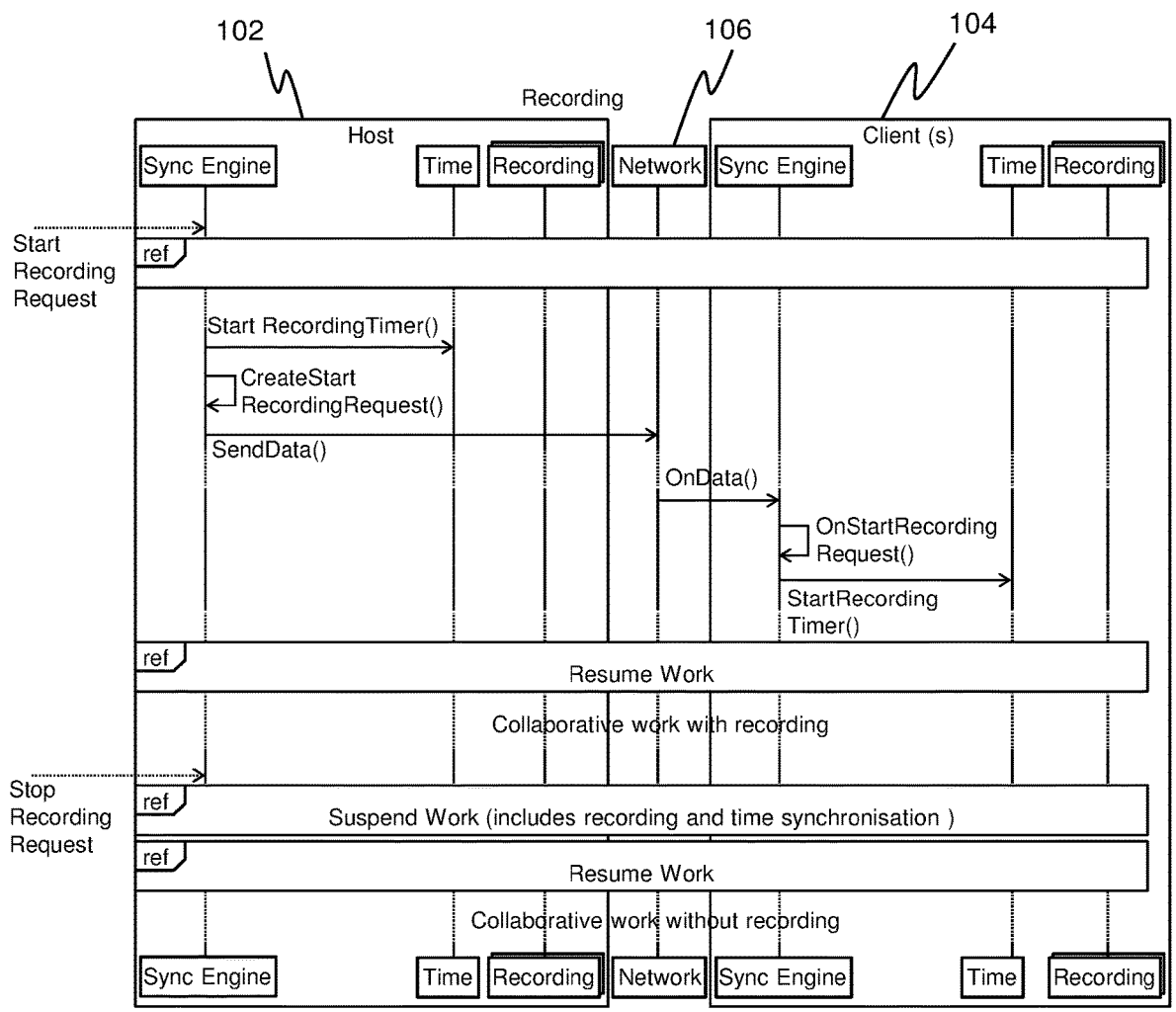
FIG. 7 is an exemplary sequence diagram for recording at least one modified object to compile the temporal record, in accordance with an embodiment of the present disclosure.

FIG. 7 is an exemplary sequence diagram for recording the at least one modified object to compile the temporal record, in accordance with an embodiment of the present disclosure. At first, a recording request is sent from the computing arrangement 102 to the plurality of devices 104, via the communication network 106. Subsequently, work is suspended within the online collaboration session. A recording timer is started and recording begins at the plurality of devices 104. Thereafter, work is resumed within the online collaboration session. Collaborative work is performed whilst being recorded until a request to stop recording is sent from the computing arrangement 102 to the plurality of devices 104. Upon this, recording is suspended and collaborative work on the digital project is resumed without recording.

Figure 8:
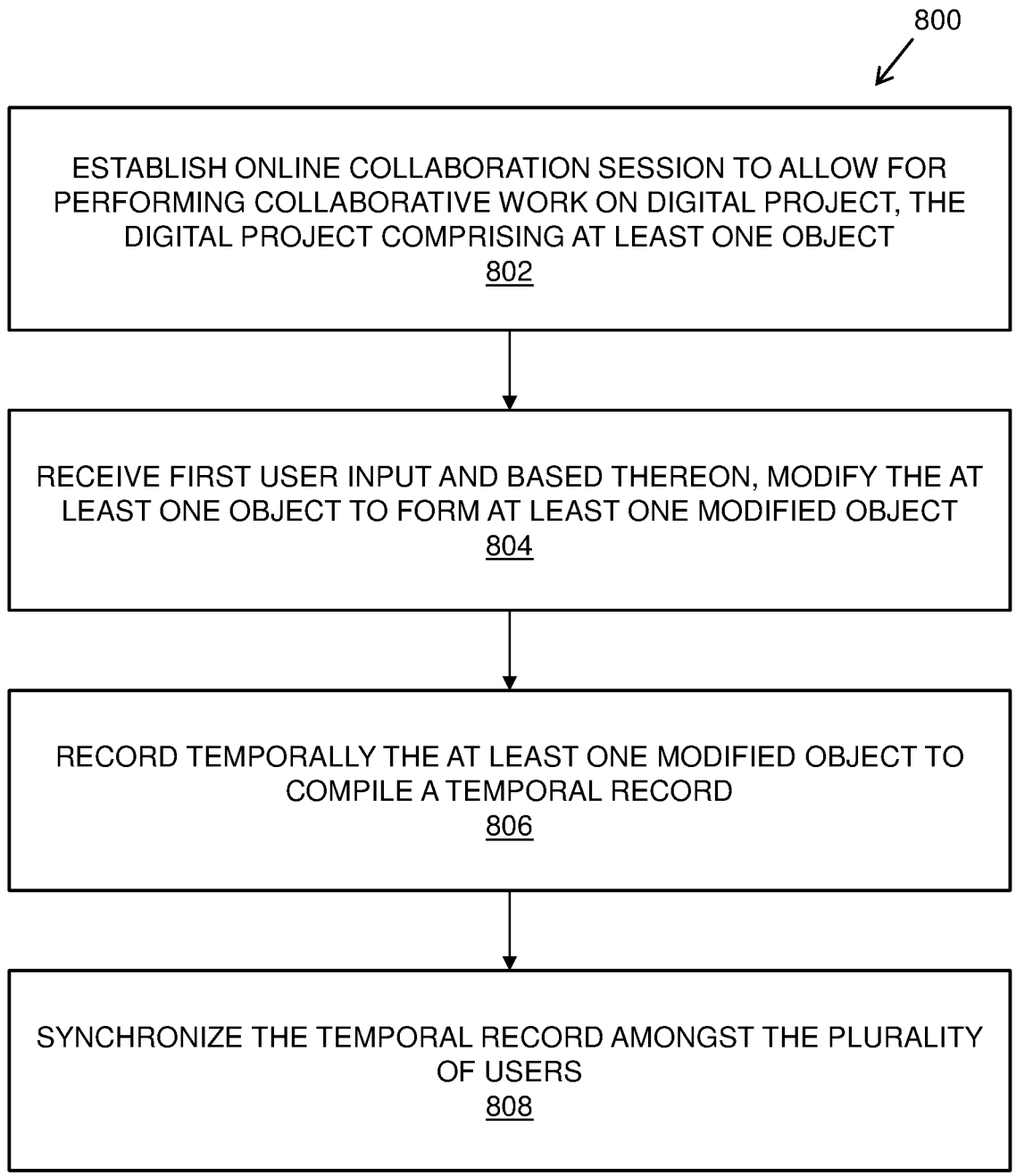
FIG. 8 illustrates step of a method for recording an online collaboration session, in accordance with an embodiment of the present disclosure.

FIG. 8 illustrates step of a method 800 for recording an online collaboration session, in accordance with an embodiment of the present disclosure. At a step 802, the online collaboration session is established to allow for performing collaborative work on a digital project, the digital project comprising at least one object, wherein the digital project is shared between a plurality of users. At a step 804, the first user input is received from one of the plurality of users and based thereon the at least one object is modified to form at least one modified object. At a step 806, the at least one modified object is recorded temporally to compile the temporal record. At a step 808, the temporal record is synchronized amongst the plurality of users.

The steps 802 to 808 are only illustrative and other alternatives can also be provided where one or more steps are added, one or more steps are removed, or one or more steps are provided in a different sequence without departing from the scope of the claims herein.

Optionally, the method 800 further comprises:
  receiving a second user input;
  editing the temporal record based on the second user input; and
  outputting the output stream based on the edited temporal record.

Optionally, in the method 800, editing the temporal record comprises any one of:
  adding an additional object to the temporal record,
  removing the at least one modified object from the temporal record,
  combining a plurality of modified objects in the temporal record, and
  modifying one or more properties of the at least one modified object in the temporal record.

Optionally, in the method 800, the at least one object or at least one modified object comprises one or more properties, the one or more properties comprises one or more of an on screen position, on screen size and content of the at least one object or at least one modified object.

Optionally, in the method 800, the content of the at least one object or at least one modified object comprises one or more of a video file or an audio file.

Optionally, in the method 800, the at least one object or the at least one modified object is stored at a local data storage or a remote data storage.

Optionally, the method 800 further comprises encrypting the temporal record prior to synchronizing the temporal record with the plurality of devices.

Optionally, the method 800 further comprises decrypting the temporal record after synchronizing the temporal record with the plurality of devices.

Figure 9:
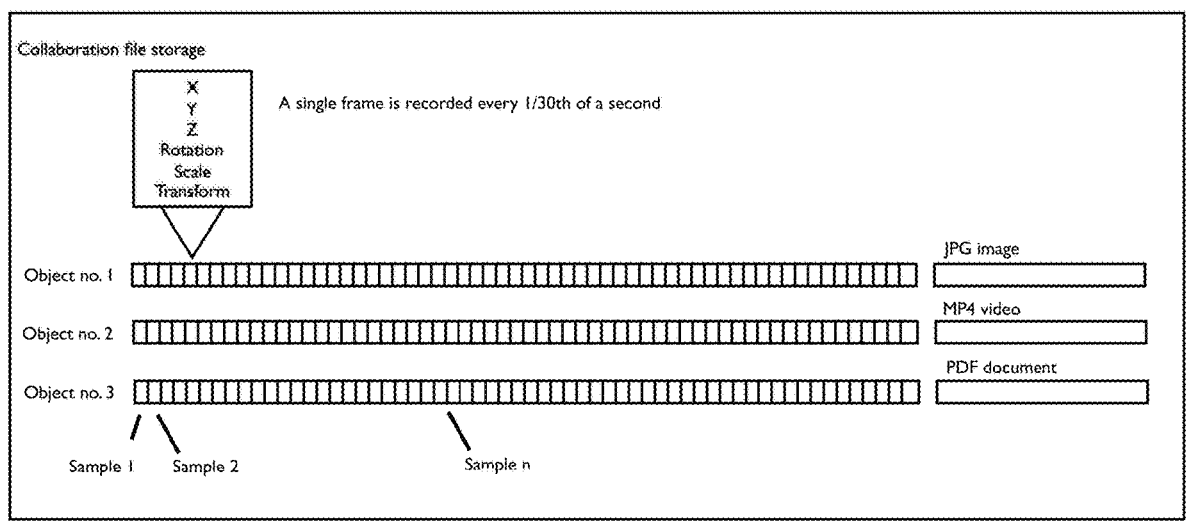
FIG. 9 illustrates a formation of a chain of changes in objects' properties, in accordance with an embodiment of the present disclosure.

FIG. 9 illustrates a formation of a chain of changes in objects' properties, which provides further details of the embodiments of the present disclosure.

In yet another aspect, an embodiment of the present disclosure provides a computer program product comprising instructions to cause the aforementioned online collaboration recording system to carry out the aforementioned method. Specifically, the computer program product comprises a non-transitory machine-readable data storage medium having stored thereon program instructions that, when accessed by the computing arrangement, cause the computing arrangement to execute the aforementioned method.

The present disclosure provides the aforementioned online collaboration recording system and the aforementioned method for recording an online collaboration session. The online collaboration recording system allows for compiling a temporal record of an entirety or a portion of collaborative work performed during the online collaboration session and not simply an end result of such collaborative work. As a result, a viewer of the temporal record is provided useful contextual information pertaining to the collaborative work performed during the online collaboration session. Beneficially, the temporal record is compiled as a core functionality of the online collaboration recording system. Moreover, the online collaboration recording system optionally allows for editing the temporal record by way of object-based editing to modify content of the temporal record. The online collaboration recording system provides a single solution for creation, execution, recording, and sharing of the collaborative work between multiple users. The aforementioned method is easy to implement, and allows for capturing the online collaboration session in a non-linear manner. Specifically, the temporal record can be compiled by assembling recordings of collaborative work performed at various time instants in a flexible manner (for example, by rearranging such recordings, overriding previously saved recordings, and the like). Furthermore, the online collaboration recording system can be easily integrated with existing networks, file storage systems, devices and the like. Therefore, cost of implementing such a system are very nominal.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. An online collaboration recording system for recording and editing an online collaboration session, comprising:
   a computing arrangement in communication with a plurality of devices, wherein each of the plurality of devices is accessible by a different user during the online collaborating session, wherein in operation the computing arrangement executes instructions to synchronize a digital project in said online collaborating session amongst the plurality of devices, by:
      establishing, via a communication module, said online collaboration session for performing collaborative work on the digital project, the digital project comprising at least one object;
      receiving, via the communication module or an input interface, a first user input and based thereon modifying one or more properties of the at least one object to form at least one modified object;
      recording temporally, via a recorder, the at least one modified object to compile a temporal record, wherein a current state of one or more properties of the at least one object or modified object are stored in a record frame, wherein the current state of the one or more properties of the at least one object or modified object is restored at any point in time from a corresponding record frame into a replay frame, and the one or more properties comprise one or more of an on-screen position, an on-screen size and a content of the at least one object modified object; and
      synchronizing, via the communication module, the temporal record amongst the plurality of devices; and
   enabling an editing of the temporal record by any one of the plurality of devices by one or more of adding an additional object to the temporal record; removing the at least one modified object from the temporal record; combining a plurality of modified objects in the temporal record, wherein a change in a past section of the temporal record generates a corresponding reaction in a further part of the temporal record.

2. The online collaboration recording system of claim 1, wherein in operation the computing arrangement edits the at least one modified object in the temporal record for outputting an output stream, by:
   receiving, via the communication module or the input interface, a second user input;
   editing, via an editor, the temporal record based on the second user input; and
   outputting, via an output interface, the output stream based on the edited temporal record.

3. The online collaboration recording system of claim 2, wherein the computing arrangement, in operation, edits the temporal record by any one of:
   adding an additional object to the temporal record,
   removing the at least one modified object from the temporal record,
   combining a plurality of modified objects in the temporal record, and
   modifying one or more properties of the at least one modified object in the temporal record.

4. The online collaboration recording system of claim 1, wherein the at least one object or at least one modified object comprises one or more properties, the one or more properties comprises one or more of an on-screen position, onscreen size and content of the at least one object or at least one modified object.

5. The online collaboration recording system of claim 4, wherein the content of the at least one object or at least one modified object comprises set of temporal changes in said object's or said modified object's properties and/or one or more of a video file or an audio file.

6. The online collaboration recording system of claim 1, wherein the at least one object or the at least one modified object is stored at a local data storage or a remote data storage as set of objects or modified objects and temporal changes to each of the objects and modified objects.

7. The online collaboration recording system of claim 1, wherein in operation the computing arrangement, via an encryption module, encrypts the temporal record prior to synchronizing the temporal record with the plurality of devices.

8. The online collaboration recording system of claim 7, wherein in operation the computing arrangement or the plurality of devices, via a decryption module, decrypts the encrypted temporal record after synchronization.

9. A method for recording and editing an online collaboration session, the method comprising:
   establishing the online collaboration session to allow for performing simultaneous collaborative work on a digital project, the digital project comprising at least one object, wherein the digital project is shared and simultaneously modified between a plurality of users;
   receiving a first user input from one of the plurality of users and based thereon modifying the at least one object to form at least one modified object;
   recording temporally the at least one modified object to compile a temporal record, wherein a current state of one or more properties of the at least one object or modified object are stored in a record frame and the current state of the one or more properties of the at least one object or modified object is restored from a corresponding record frame into a replay frame, wherein the one or more properties comprise one or more of an on-screen position, an on-screen size and a content of the at least one object or modified object;
   synchronizing the temporal record amongst the plurality of users; and
   enabling an editing of the temporal record by any one of the plurality of devices by one or more of adding an additional object to the temporal record; removing the at least one modified object from the temporal record; combining a plurality of modified object in the temporal record; wherein a change in a past section of the temporal record generates a corresponding reaction in a further part of the temporal record.

10. The method of claim 9, wherein the method further comprises:
   receiving a second user input;
   editing the temporal record based on the second user input; and outputting the output stream based on the edited temporal record.

11. The method of claim 10, wherein editing the temporal record comprises any one of:
adding an additional object to the temporal record,
removing the at least one modified object from the temporal record,
combining a plurality of modified objects in the temporal record, and modifying one or more properties of the at least one modified object in the temporal record.

12. The method of claim 9, wherein the at least one object or at least one modified object comprises one or more properties, the one or more properties comprises one or more of an on-screen position, on screen size and content of the at least one object or at least one modified object.

13. The method of claim 12, wherein the content of the at least one object or at least one modified object comprises one or more set of changes in object's properties over recorded period of time.

14. The method of claim 9, wherein the at least one object or the at least one modified object is stored at a local data storage or a remote data storage.

15. The method of claim 9, wherein the method further comprises encrypting the temporal record prior to synchronizing the temporal record with the plurality of devices.

16. The method of claim 15, wherein the method further comprises decrypting the temporal record after synchronizing the temporal record with the plurality of devices.

17. A computer program product comprising a non-transitory machine-readable data storage medium having stored thereon program instructions to cause an online collaboration recording system to carry out a method for recording an online collaboration session, the online collaboration recording system comprising a computing arrangement in communication with a plurality of devices, wherein each device is accessible by a user during the online collaboration session, the method comprising:
establishing the online collaboration session to allow for performing simultaneous collaborative work on a digital project, the digital project comprising at least one object, wherein the digital project is shared and simultaneously modified between a plurality of users;
receiving a first user input from one of the plurality of users and based thereon modifying the at least one object to form at least one modified object;
recording temporally the at least one modified object to compile a temporal record; and
synchronizing the temporal record amongst the plurality of users, wherein a current state of one or more properties of the at least one object or modified object are stored in a record frame and the current state of the one or more properties of the at least one object or modified object is restored from a corresponding record frame into a replay frame, wherein the one or more properties comprise one or more of an on-screen position, an on-screen size and a content of the at least one object or modified object;
synchronizing, via the communication module, the temporal record amongst the plurality of devices; and
enabling an editing of the temporal record by any one of the plurality of devices by one or more of adding an additional object to the temporal record; removing the at least one modified object from the temporal record; combining a plurality of modified objects in the temporal record and modifying one or more properties of the at least one modified object in the temporal record;
wherein a change in a past section of the temporal record generates a corresponding reaction in a further part of the temporal record.

\* \* \* \* \*